United States Patent
Koike-Akino et al.

(10) Patent No.: US 9,716,536 B2
(45) Date of Patent: Jul. 25, 2017

(54) SYSTEM AND METHOD FOR WIRELESS COMMUNICATIONS OVER FADING CHANNELS

(71) Applicant: Mitsubishi Electric Research Laboratories, inc., Cambridge, MA (US)

(72) Inventors: Toshiaki Koike-Akino, Malden, MA (US); Philip Orlik, Cambridge, MA (US); Kyeong Jin Kim, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 52 days.

(21) Appl. No.: 14/662,759

(22) Filed: Mar. 19, 2015

(65) Prior Publication Data
US 2016/0277083 A1   Sep. 22, 2016

(51) Int. Cl.
- *H04B 7/0426* (2017.01)
- *H04B 7/0456* (2017.01)
- *H04B 7/06* (2006.01)

(52) U.S. Cl.
CPC ......... *H04B 7/0456* (2013.01); *H04B 7/0426* (2013.01); *H04B 7/0615* (2013.01)

(58) Field of Classification Search
CPC .. H04B 7/0413; H04B 7/0426; H04B 7/0615; H04B 7/0456
See application file for complete search history.

(56) References Cited

U.S. PATENT DOCUMENTS

| | | | |
|---|---|---|---|
| 6,590,889 B1 * | 7/2003 | Preuss | H04B 7/1858 370/321 |
| 7,184,708 B1 * | 2/2007 | Kwa | H04B 15/02 455/114.2 |
| 8,290,074 B2 | 10/2012 | Annavajjala et al. | |
| 2004/0071240 A1 | 4/2004 | Betts | |
| 2007/0165566 A1 | 7/2007 | Khan et al. | |
| 2008/0287075 A1 | 11/2008 | Kim et al. | |
| 2008/0305788 A1 | 12/2008 | Malladi et al. | |
| 2009/0122854 A1 | 5/2009 | Zhu et al. | |
| 2010/0080279 A1 | 4/2010 | Saints et al. | |

(Continued)

*Primary Examiner* — David B. Lugo
(74) *Attorney, Agent, or Firm* — Gene Vinokur; James McAleenan (57) ABSTRACT

The data are communicated from a transmitter to a receiver in a wireless communications network. Data symbols are modulated using a coded modulation to produce modulated symbols and the modulated symbols are precoded using a precoder matrix to produce precoded symbols. The precoder matrix is formed using a rotation matrix including phase angles for at least some elements of the rotation matrix with values determined according to a parametric function of indices of the elements storing the phase angles. Next, the data packets are formed using the precoded symbols and the data packets are transmitted over the wireless network. Multi-stage parametric phase precoding provides full-diversity and full-rate transmissions by using fast-transformable unitary matrices and deterministic diagonal phase rotation, whose phase angles are pre-determined to minimize the union bound for time-selective and frequency-selective fading channels.

14 Claims, 7 Drawing Sheets

(56) References Cited

U.S. PATENT DOCUMENTS

| | | | |
|---|---|---|---|
| 2010/0202500 A1* | 8/2010 | Ihm | H04B 7/0417 375/219 |
| 2011/0274200 A1* | 11/2011 | Lee | H04L 25/03343 375/295 |
| 2012/0213315 A1* | 8/2012 | Couillet | H04L 25/022 375/343 |
| 2013/0279628 A1* | 10/2013 | Mizuta | H04B 7/0417 375/296 |
| 2014/0247894 A1 | 9/2014 | Wang et al. | |

* cited by examiner

1-Stage Precoding: $P = U$ — 511

|    | FFT    | FCT    | FST    | FWT    | FHT    | Identity |
|----|--------|--------|--------|--------|--------|----------|
| UB | 9.0e-5 | 9.0e-5 | 1.4e-4 | 3.4e-4 | 9.0e-5 | 9.0e-5   |

2-Stage Precoding: $P = UD$ — 521

|          | FFT     | FCT     | FST     | FWT     | FHT    |
|----------|---------|---------|---------|---------|--------|
| UB       | 7.3e-10 | 4.1e-13 | 2.6e-13 | 3.0e-11 | 6.5e-13 |
| Scale    | 0.928   | 0.495   | 0.932   | 0.972   | 0.375  |
| Exponent | 1.00    | 3.00    | 3.75    | 2.50    | 3.00   |

2-Stage Precoding: $P = U^\dagger D$ — 522

|          | FFT | FCT | FST | FWT | FHT |
|----------|-----|-----|-----|-----|-----|
| UB       |     |     |     |     |     |
| Scale    |     |     |     |     |     |
| Exponent |     |     |     |     |     |

3-Stage Precoding: $P = UDU^\dagger$ — 531

|          | FFT    | FCT     | FST     | FWT    | FHT     |
|----------|--------|---------|---------|--------|---------|
| UB       | 9.0e-5 | 1.8e-13 | 1.8e-13 | 9.0e-5 | 6.1e-12 |
| Scale    | 0.370  | 0.970   | 0.955   | 0.835  | 0.250   |
| Exponent | 0.75   | 1.75    | 2.25    | 3.00   | 4.00    |

3-Stage Precoding: $P = U^\dagger DU$ — 532

|          | FFT    | FCT    | FST    | FWT    | FHT    |
|----------|--------|--------|--------|--------|--------|
| UB       | 9.0e-5 | 5.0e-5 | 5.0e-5 | 9.0e-5 | 5.0e-5 |
| Scale    | 0.061  | 0.193  | 0.891  | 0.835  | 0.698  |
| Exponent | 0.25   | 3.50   | 2.50   | 3.00   | 4.00   |

4-Stage Precoding: $P = UDU^\dagger D^\dagger$ — 541

|          | FFT     | FCT     | FST     | FWT     | FHT     |
|----------|---------|---------|---------|---------|---------|
| UB       | 1.6e-13 | 1.9e-13 | 1.7e-13 | 1.5e-13 | 2.0e-13 |
| Scale    | 0.385   | 0.769   | 0.880   | 0.802   | 0.780   |
| Exponent | 2.50    | 4.00    | 3.75    | 2.50    | 1.25    |

4-Stage Precoding: $P = U^\dagger DUD^\dagger$ — 542

|          | FFT     | FCT     | FST     | FWT     | FHT     |
|----------|---------|---------|---------|---------|---------|
| UB       | 1.6e-13 | 1.8e-13 | 1.8e-13 | 1.5e-13 | 1.7e-13 |
| Scale    | 0.783   | 0.831   | 0.772   | 0.802   | 0.209   |
| Exponent | 2.75    | 3.50    | 2.75    | 2.50    | 4.00    |

Fig. 6

SYSTEM AND METHOD FOR WIRELESS COMMUNICATIONS OVER FADING CHANNELS

FIELD OF THE INVENTION

This invention is generally related to the field of wireless communications and particularly to wireless communications suitable for transmissions over time-selective and/or frequency-selective fading channels.

BACKGROUND OF THE INVENTION

In mobile wireless communications networks, a quality of transmissions is often impaired by deep fading, which varies in time, frequency, and/or space domain. To solve deep fading in radio communications, diversity transmission and diversity reception have been used to reduce a probability of bit errors by using multiple copies of transmitting data. The diversity transmission usually requires redundant data over different time, frequency, polarization, space, delay, or any combination thereof. For example, a delay diversity transmission uses multiple transmitting antennas and sends the same data from different antennas with delays instead of multiplexing different data at a cost of antenna redundancy and multiplexing loss. The multiple copies of the same data provide a diversity gain, which reduces the probability of bit errors occurred at a time when the deep fading significantly reduces the channel quality.

For frequency-selective fading, some radio networks have adopted orthogonal frequency-division multiplexing (OFDM) based on a discrete Fourier transform (DFT), which converts a frequency-selective channel into multiple frequency-flat sub-channels in the Fourier basis. Although the OFDM can simplify a receiver by avoiding a need of channel equalization for inter-symbol interference, the diversity gain cannot be obtained without an additional coding across the frequency domain. Because such a coding over the frequency domain can decrease a data rate due to parity bits overhead, a full-rate transmission and diversity gain cannot be achieved at the same time. In order to achieve higher diversity gain, wideband signal transmissions have been used so that the signal bandwidth is wider than a coherence bandwidth of the frequency-selective fading channels to obtain independently faded multiple data.

In recent years, machine-to-machine (M2M) networks are increasingly used to connect billions of devices for various applications, including factory automation, intelligent transport systems, healthcare systems, and smart home appliances. For such M2M networks, reliable communications and low-latency communications are of great importance. Hence, such applications cannot use a long forward error correction (FEC) code, such as capacity-approaching low-density parity-check (LDPC) codes. As a consequence, some techniques for short-message data transmission achieving a full diversity gain have been demanded by fully exploiting time, frequency, space, and polarization resources.

Some diversity transmission methods, based on space-time coding (STC), can achieve a full rate and full diversity. However, using multiple antennas can limit the application for the cases with limited energy or computational resources. One method, described in U.S. Pat. No. 8,290,074, uses a pseudo-random phase precoding (PRPP) to reduce the complexity of adaptive precoding and to achieve the full diversity gain. However, such random precoding methods have no guarantee to keep the transmission signal power normalized, and to maintain the codeword distance large enough.

In a similar context, unitary random phase precoding is used by a method described in U.S. 2014/0247894 to solve the power fluctuation problem. However, such a precoding is also random and requires a feedback link so that the precoder is selected adaptively depending on channel state information (CSI) to maximize a signal power at the receiver. Such an adaptive precoding cannot work without a reliable feedback channel, especially for mobile communications networks wherein the transmitter or the receiver is moving fast.

Accordingly, there is a need in the art for a method that is suitable for transmission over fading channels, and simultaneously improves diversity gain while maintaining the data rate.

SUMMARY OF THE INVENTION

It is an object of some embodiments of the invention to provide a system and a method for transmitting data over wireless fading channels from a transmitter to a receiver, particularly when the transmitter and receiver are mobile. It is another object of some embodiments to provide such a method that is suitable for transmission over fading channels while reducing overhead and increasing a diversity gain.

Some embodiments are based on recognition that deterministic phase precoding of the data can reduce complexity of the adaptive precoding and increase the diversity gain of the transmitted data. It is also recognized that random generation of phase angles precludes the possibility for optimization of those values, because power of the data precoded with randomly generated phase angles can vary. Also, in random precoding, the diversity gain of the precoded data can be lost with a certain probability.

Accordingly, some embodiments of the invention are based on recognition that phase angles for the phase precoding of the transmitted data has to be generated deterministically according to a parametric function. To that end, some embodiments precode the data with a precoder matrix formed using a rotation matrix including phase angles for at least some elements of the rotation matrix with values determined according to a function of indices of the elements storing the phase angles. Generating values according to the function of the indices can provide the uniqueness of the values of the phase angles.

Some embodiments of the invention are based on the realization that the function of the indices can also be a function of one or several parameters, such that the values of those parameters can be optimized for the specific type of the transmission. This realization allows using the same function with different values of parameters for different types of the transmission.

For example, some embodiments select the values of the parameters to reduce a bit-error rate (BER) over the transmission. For example, some embodiments test different values of the parameters for different functions and/or types of the precoding to select the function and the parameter values in order to reduce a union bound (UB) over all pairwise error probability (PEP) of the precoded symbols. Additionally or alternatively, one embodiment selects the values of the parameters for different types of coded modulation. In such a manner, the embodiment provides a joint optimization of the coded modulation and the precoding.

Some embodiments of the invention are based on additional recognition that the signal power can be constant with the precoder matrix formed by a combination of unitary transform matrices and the rotation matrix. In such a manner, the rotation matrix can be a diagonal matrix having only diagonal elements storing the phase angles. Thus, each diagonal element is identified only by one index, which simplifies the function and reduces the number of generated phase angles. Also, the product of the diagonal rotation matrix with the unitary transform matrix spread the phase angle values to other non-diagonal positions while preserving the diversity.

Some embodiments of the invention are based on yet another realization that it can be advantageous to form the precoder matrix in stages by multiplying the diagonal rotation matrix with a different unitary transform matrix at each stage of precoding. For example, the two-stage precoding includes a product of the diagonal rotation matrix with one unitary matrix. Three-stage precoding includes a product of the diagonal rotation matrix with two different unitary transform matrices. This multi-stage parametric phase precoding (MS-PPP) increases distribution and variations of the phase angles from the diagonal of the rotation matrix to increase the diversity gain.

One embodiment of the invention is based on the observation that four-stage of the precoding can be advantageous for both time-selective and frequency-selective fading channels. This is because the frequency-selective fading effectively takes place a multiplication of the precoder matrix with an inverse discrete Fourier transform (DFT) that can cancel the effect of multiplication by one unitary transform matrix of the multi-stage precoding. The four-stage precoding compensates for the possibility of such cancellation for different type of unitary transforms.

In some embodiments, the unitary transform matrices include various different fast transforms including a fast cosine transform (FCT), a fast slant transform (FST), a fast Walsh transform (FWT), and a fast Haar transform (FHT). Because those transforms are real-valued or semi-integer-valued basis functions, lower complexity implementation is possible compared to a fast Fourier transform (FFT), which requires complex-valued multiplications. In particular, the deterministic phase precoding in combination with fast unitary transforms can still achieve a full diversity gain while the computational complexity is reduced to a log-linear order from a quadratic order.

The methods of the invention solve another problem that PRPP has an unpredictable power fluctuation due to the randomness, which complicates a transmission power control. Using the diagonal phase rotation and unitary transforms of FFT, FCT, FST, FWT, or FHT, the transmission power of MS-PPP is controllable to be a target constant value.

Accordingly, one embodiment discloses a method for communicating data from a transmitter to a receiver in a wireless communications network. The method includes modulating data symbols using a coded modulation to produce modulated symbols; precoding the modulated symbols using a precoder matrix to produce precoded symbols, wherein the precoder matrix is formed using a rotation matrix including phase angles for at least some elements of the rotation matrix with values determined according to a parametric function of indices of the elements storing the phase angles; forming data packets using the precoded symbols; and transmitting the data packets over the wireless network, where at least some steps of the method are performed by the transmitter.

Another embodiment discloses a transmitter for communicating data to a receiver in a wireless network including a modulator for modulating data symbols using a coded modulation to produce modulated symbols; a precoder for precoding the modulated symbols using a precoder matrix to produce precoded symbols, wherein the precoder matrix is formed using multiple unitary transforms including a diagonal phase rotation for at least some of the unitary transforms with phase angle values determined according to a parametric function of indices of the diagonal elements storing the phase angles; a framer for forming data packets using the precoded symbols; and a digital-analog (D/A) front-end for transmitting the data packets over the wireless network, where steps of the method are performed by the transmitter.

DETAILED DESCRIPTION OF THE PREFERRED EMBODIMENTS

Figure 1:
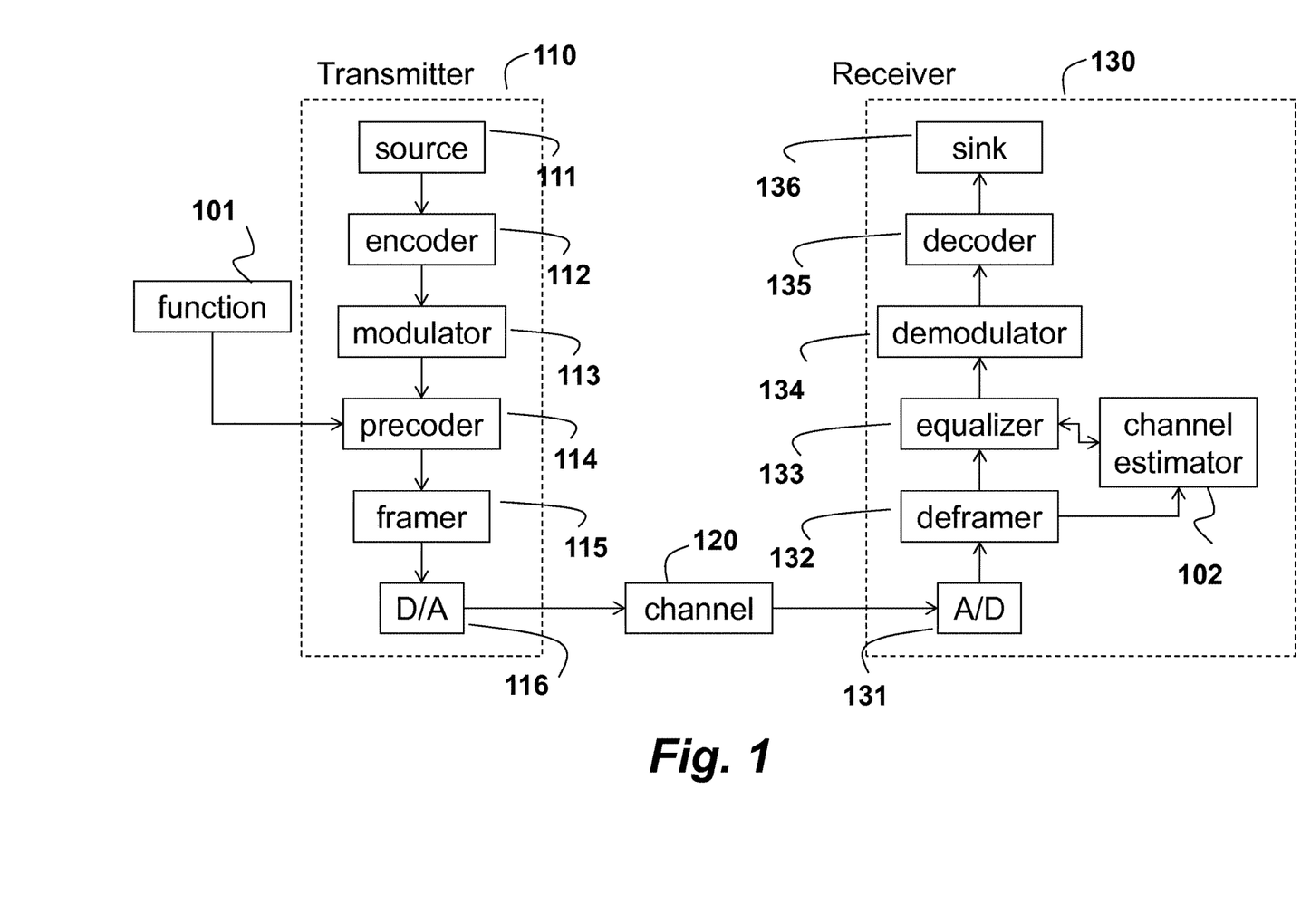
FIG. 1 is a block diagram of a method and system for communicating data in a wireless network employing principles of transmission diversity according to some embodiments of the invention.

FIG. 1 shows a block diagram of a method for communicating data from a transmitter to a receiver in a wireless network employing principles of transmission diversity according to some embodiments of the invention. The transmitter 110 encodes data from a source 111 at an encoder 112 by using a forward error correction (FEC) code. For applications with no stringent latency requirement, a capacity-approaching large block size low-density parity-check (LDPC) code can be used as the FEC code. For latency-critical applications, such as machine-to-machine (M2M) networks, shorter codes such as Hamming code, Reed-Muller (RM) code, Reed-Solomon (RS) code, or Bose-Chaudhuri-Hocquenghem (BCH) code, can be used.

The encoded data are modulated at a modulator 113 by using a modulation format, e.g., quadrature-amplitude modulation (QAM). In one embodiment, the modulation format uses a high-dimensional modulation (HDM) based on block coding, or lattice packing. The methods of the invention precode the modulated data at a precoder 114 by using parametric phase precoding, which is based on a parametric function 101. A framer 115 forms data packets using the precoded symbols. For example, the framer interleaves the precoded data and inserts pilot symbols. The data packets are transmitted through a digital-analog (D/A) front-end 116, in which band-pass filter, radio-frequency (RF) up-convertor, power amplifier, and transmitting antenna are used.

The transmitted data propagates over a channel 120 from the transmitter 110 to the receiver 130. For mobile wireless communications, the channel can be subject to fading over time, frequency, space, and polarization domain. The fading occurs e.g., due to movements of the transmitter, the receiver, and intervening obstacles. The channel fading varies over time depending on a Doppler spectrum, and over frequency depending on a delay spectrum. With a certain probability, the channel fading deteriorates the communications quality significantly at a time when an instantaneous signal-to-noise ratio (SNR) abruptly goes down by tens of dB loss.

The receiver 130 performs an analog-digital (A/D) front-end conversion 131 to receive output of the channel 120 to produce received data. For example, the A/D front-end 131 comprises a power amplifier, an RF down-convertor, and a band-pass filter. The received data are impaired, e.g., by interference, noise, and the channel fading.

The received data are processed by a deframer 132, in which pilot symbols are submitted to a channel estimator 102 and the received data are inversely interleaved to produce deframed data. The pilot symbols are used to estimate instantaneous channel state information (CSI) at the channel estimator 102.

The deframed data are equalized by an equalizer 133 to produce equalized data, which are estimates of the modulated data. The equalizer also uses an estimate of CSI provided from the channel estimator 102. Based on the estimated CSI, the equalizer 133 uses a soft-input soft-output decision to deal with interference due to time- or frequency-selective fading channels. The equalizer 133 plays a role in inverse precoding as well as equalizing the fading channel.

A demodulator 134 demodulates the equalized output data to produce demodulated data, which are estimates of the encoded data. In one embodiment, the demodulated data are fed back to the channel estimator 102 to improve the estimation accuracy of the CSI. The re-estimated CSI can be used again at the equalizer 133 to refine the equalized output data. The demodulated data are decoded by a decoder 135 to correct potential bit errors occurred through the overall communications network to produce decoded data. The decoded data are submitted to a sink 136, as estimates of the source data.

Some embodiments are based on recognition that phase precoding of the data can reduce complexity of the adaptive precoding and increase the diversity gain of the transmitted data. It is also recognized that random generation of phase angles precludes the possibility for optimization of those values, because the diversity gain of the precoded data can be lost with a certain probability. Also, power of the data precoded with randomly generated phase angles can vary for random precoding.

Accordingly, some embodiments of the invention are based on recognition that phase angles for the phase precoding of the transmitted data has to be generated deterministically according to a parametric function. To that end, some embodiments precode the data with a precoder matrix formed using a rotation matrix including phase angles for at least some elements of the rotation matrix with values determined according to a parametric function 101, e.g., a function of indices of the elements storing the phase angles. Generating values according to the function of the indices can provide the uniqueness of the values of the phase angles.

The transmitter 110 and the receiver 130 include, e.g., transmitting circuits, receiving circuits, processors for signal processing, and memory for storing encoding/decoding and modulating/demodulating data. For example, the memory can store the precoder matrix used for precoding the modulated symbols.

Parametric Phase Precoding (PPP)

Figure 2A:
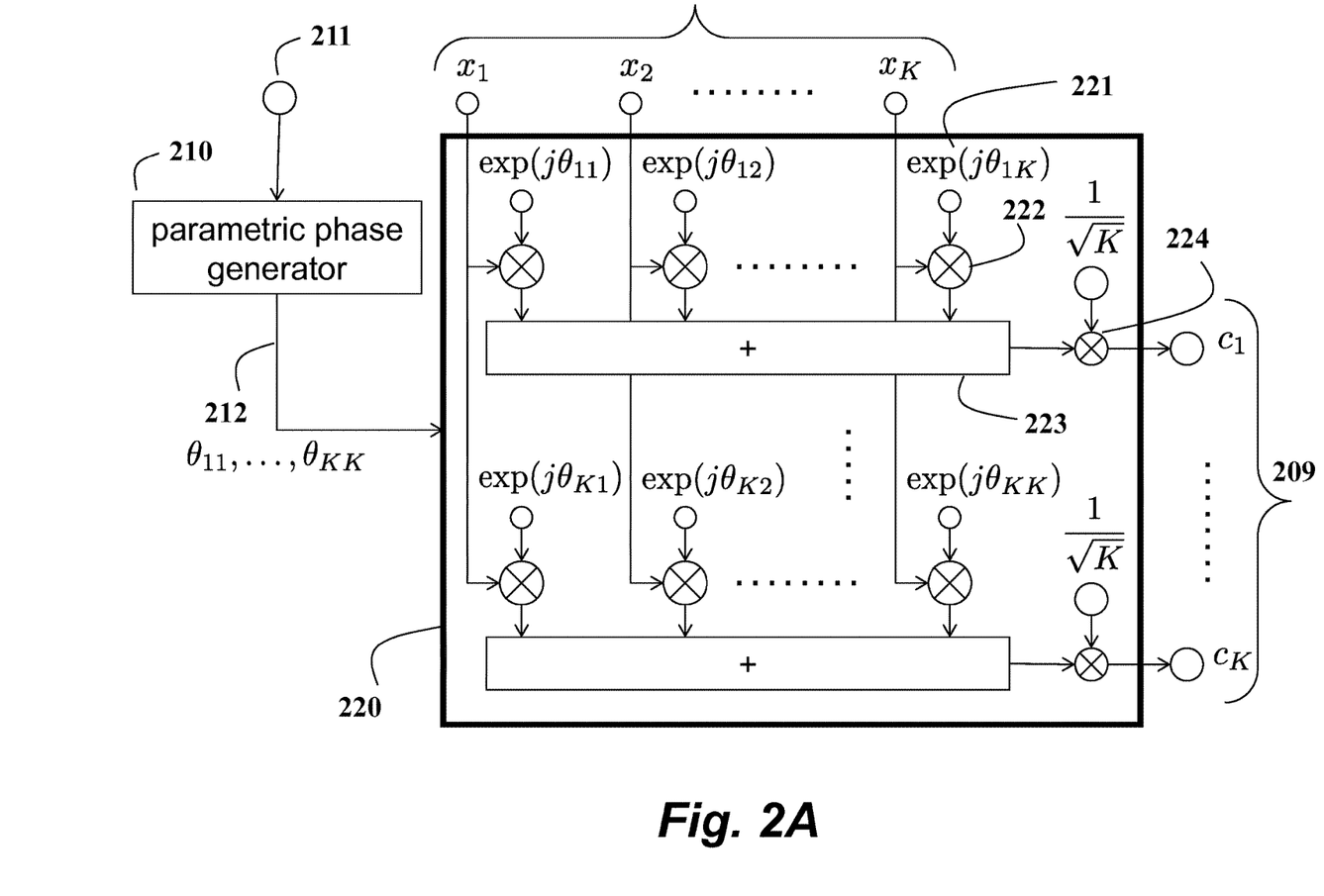
FIGS. 2A and 2B are block diagrams of a method for phase precoding according to some embodiments of the invention.

FIG. 2A shows a precoder based on a parametric phase precoding (PPP) according to some embodiments of the invention. The PPP multiplies the modulated data x with a precoder matrix P, whose elements are complex-valued rotations having a generated phase angle as follows:

$$P = \frac{1}{\sqrt{K}} \exp\left( j \begin{bmatrix} \theta_{11} & \cdots & \theta_{1K} \\ \vdots & \ddots & \vdots \\ \theta_{K1} & \cdots & \theta_{KK} \end{bmatrix} \right),$$

where the precoder matrix P is a size of K×K, K is a precoder size, exp(•) denotes an element-wise exponential function, $j=\sqrt{-1}$ is an imaginary unit, $\theta_{nm}$ is the (n, m)-th phase angle.

In FIG. 2A, the $K^2$ phase angles 212 ($\theta_{11}, \theta_{12}, \ldots, \theta_{KK}$) are produced by a deterministic phase generator 210 given a parametric function 211, which is known at the transmitter and the receiver. At a precoder matrix multiplier 220, the modulated data 201 x=$[x_1, x_2, \ldots, x_K]^T$ (wherein a super-script [•]T denotes a transpose) are rotated by multiplying 222 complex values 221 of exp(j$\theta_{nm}$) given the phase angles. The precoded data 209 c=$[c_1, c_2, \ldots, c_K]^T$ are sums 223 of the individually rotated data with a normalization 224, as expressed by c=Px. For this case, the size of the modulated data is identical to the size of the precoded data so that a full-rate transmission is achieved. The advantage of PPP lies in a fact that the modulated data are individually rotated and such copies are transmitted for multiple times to achieve a diversity gain for time-selective fading channels, without losing data rates. The deterministic phase generator can solve the problem of pseudo-random phase precoding (PRPP), in which the diversity gain is not always guaranteed because of randomness.

Figure 2B:
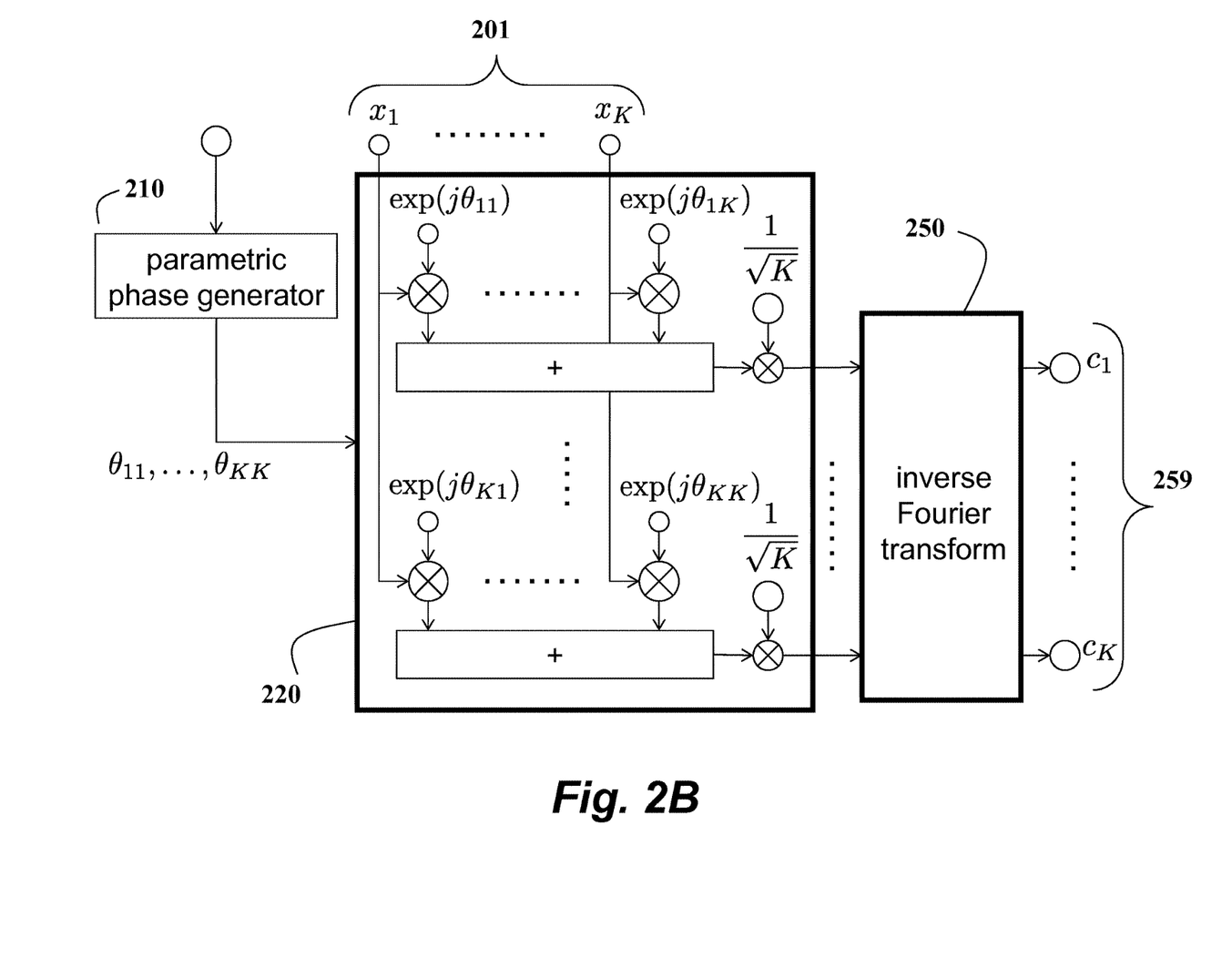

FIG. 2B shows a PPP for multi-carrier transmissions based on orthogonal frequency-division multiplexing (OFDM) according to another embodiment. OFDM has been widely used in a number of wireless networks because a frequency-selective fading channel can be converted to multiple frequency-flat fading sub-channels over a Fourier basis. In this embodiment, an inverse discrete Fourier transform (DFT) 250 is used after the phase precoder 220 to produce the precoded data 259.

The precoder matrix is thus expressed as follows:

$$P = F^\dagger \frac{1}{\sqrt{K}} \exp\left( j \begin{bmatrix} \theta_{11} & \cdots & \theta_{1K} \\ \vdots & \ddots & \vdots \\ \theta_{K1} & \cdots & \theta_{KK} \end{bmatrix} \right),$$

where F is a DFT matrix of size K×K, and a super-script $[•]^\dagger$ denotes a conjugate transpose. The DFT matrix is formed as $$F = \frac{1}{\sqrt{K}} \exp\left( j \begin{bmatrix} \phi_{11} & \cdots & \phi_{1K} \\ \vdots & \ddots & \vdots \\ \phi_{K1} & \cdots & \phi_{KK} \end{bmatrix} \right),$$

where $$\phi_{nm} = -\frac{2\pi(n-1)(m-1)}{K}.$$

the DFT is usually performed by a fast Fourier transform (FFT), in which a Cooley-Tukey butterfly architecture of log K layers computes the DFT in a log-linear complexity order of K log K.

Multi-Stage Parametric Phase Precoding (MS-PPP)

Some embodiments of the invention are based on an additional recognition that the precoder matrix of PPP does not guarantee the constant power of transmission signal, and power fluctuation issue can be solved by a combination of unitary transform matrices and the rotation matrix. In such a manner, the rotation matrix can be a diagonal matrix having only diagonal elements storing the phase angles. Thus, each diagonal element is identified only by one index, which simplifies the function and reduces the number of generated phase angles. Also, the product of the diagonal rotation matrix with the unitary transform matrix spreads the phase angle values to other non-diagonal positions while preserving the diversity.

Some embodiments of the invention are based on yet another realization that it can be advantageous to form the precoder matrix in stages by multiplying the diagonal rotation matrix with a different unitary transform matrix at each stage of precoding.

For example, the two-stage precoding includes a product of the diagonal rotation matrix with one unitary matrix. Three-stage precoding includes a product of the diagonal rotation matrix with two different unitary transform matrices. This multi-stage precoding increases distribution and variations of the phase angles from the diagonal of the rotation matrix.

One embodiment of the invention is based on the observation that four-stage precoding can be advantageous for both time-selective and frequency-selective fading channels. This is because the frequency-selective fading effectively takes place multiplication of the precoder matrix with an inverse DFT that can cancel the effect of multiplication by one unitary transform matrix of the multi-stage precoding. The four-stage precoding compensates for the possibility of such cancellation for different type of unitary transforms.

Figure 3:
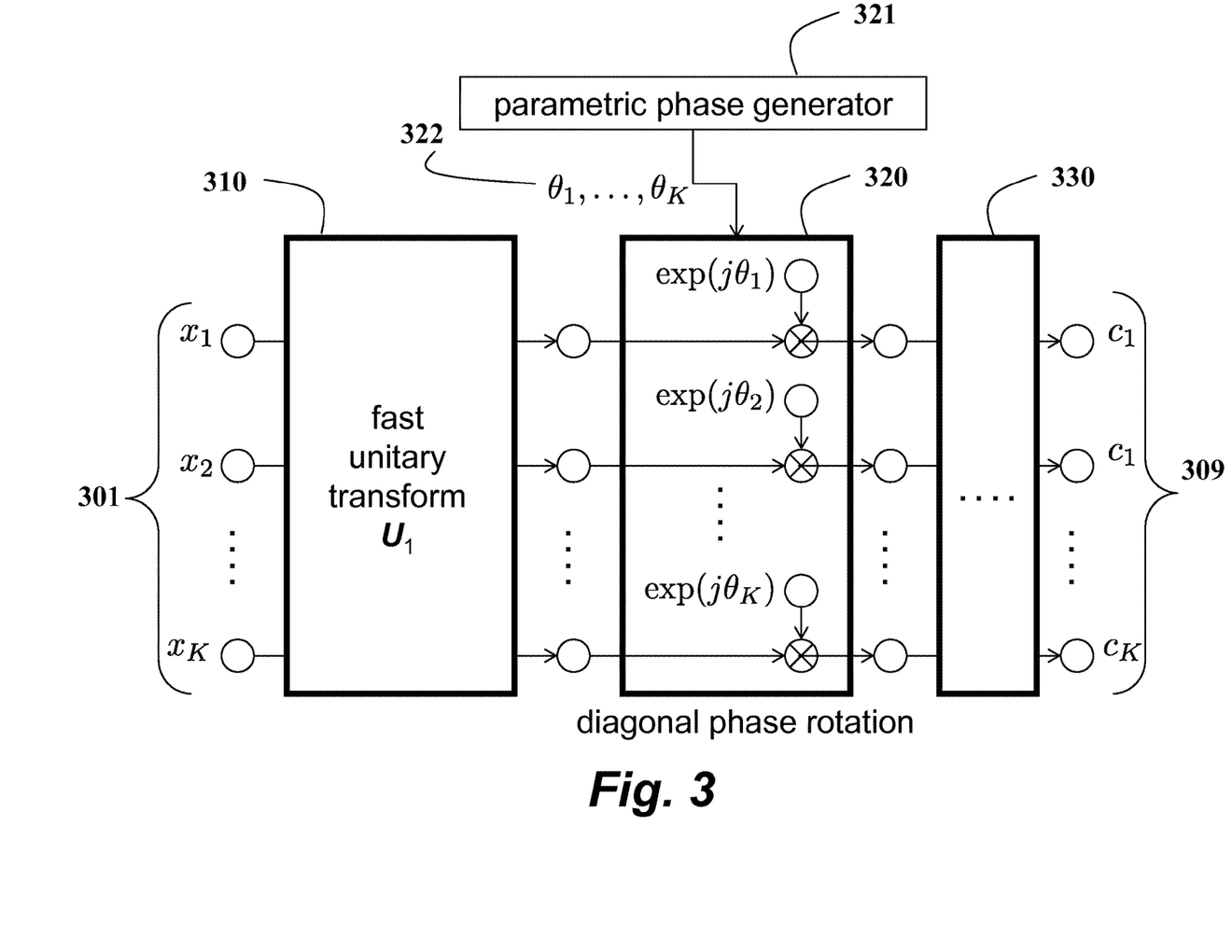
FIG. 3 is a block diagram of multi-stage parametric phase precoding (MS-PPP) according to some embodiments of the invention.

FIG. 3 shows a block diagram of multi-stage parametric phase precoding (MS-PPP) according to some embodiments of the invention. The methods of the MS-PPP use a cascaded structure of multiple unitary transforms. The modulated data x 301 are transformed by a unitary matrix $U_1$ 310 at a first stage. To have a low complexity, some embodiments use unitary transforms, which are capable of fast implementation such as FFT. In some embodiments, the precoded data c 309 are produced by multiple unitary transforms $U_1, U_2, \ldots, U_S$ 310, 320, 330 as follows $c = U_S \ldots U_2 U_1 x$, where S is the number of stages. The number of stages is an integer greater than one. The precoder matrix is expressed as $$P = U_S \ldots U_2 U_1,$$

which can solve the power fluctuation problem by the unitary precoding.

In addition, one or more of unitary transforms are based on a diagonal phase rotation 320, wherein phase rotation angles $\theta = [\theta_1, \theta_2, \ldots, \theta_K]^T$ 322 are provided by a parametric phase generator 321. The parametric phase generator is not based on any pseudo-random number generator, and, thus, deterministic.

The diagonal phase rotation 320 can be expressed by a unitary matrix as follows:

$$D = \text{diag}[\exp(j\theta)] = \begin{bmatrix} \exp(j\theta_1) & 0 & 0 \\ 0 & \ddots & 0 \\ 0 & 0 & \exp(j\theta_K) \end{bmatrix},$$

where D is a diagonal matrix of size K×K, and diag[•] denotes a diagonal matrix operator aligning an argument vector into diagonal entries. The diagonal phase rotation has a linear complexity of order K.

In some embodiments, the phase rotation angles are not adaptive to a channel condition but pre-determined to minimize the bit-error rate (BER) averaged over all channel realizations. Some embodiments of the invention use monotonically increasing phase angles based on a power function for the parametric phase generator 321. The power function produces the phase angles as follows:

$$\theta_k = \pi\alpha(k-1)^\beta,$$

where $\pi = 3.14 \ldots$ is a mathematical constant, $\alpha$ is referred to as a scale factor, and $\beta$ is referred to as an exponent factor, for the k-th phase angle. If the exponent factor is a non-negative integer, then the power function becomes a monomial function, which is a component of polynomial functions. These embodiments based on the diagonal phase rotation having the power function can significantly simplify a design procedure by reducing a total number of optimization parameters from $K^2$ values of PPP to just two (i.e., the scale and exponent factors) regardless of the precoder size K. In addition, the deterministic precoding can solve the problem of random phase precoding that the diversity gain can be lost with a certain probability, and the non-adaptive precoding can avoid the need of the channel feedback.

The power function of the parametric phase generator is simple but effective for short-message data transmissions. In one embodiment, the power function is extended to a series of power functions to improve performance by exploiting more degrees of freedom, especially for the case of larger precoder size. This embodiment uses a finite series of power functions as follows:

$$\theta_k = \sum_{i=1}^{N_p} \pi\alpha_i (k-1)^{\beta_i},$$

where $N_p$ denotes the number of power functions, $\alpha_i$ is the i-th scale factor, and $\beta_i$ is the i-th exponent factor.

In one embodiment, the MS-PPP forms the following 2-stage precoder matrix $$P = F\text{diag}[\exp(j\theta)],$$

or $$P = F^\dagger \text{diag}[\exp(j\theta)],$$

for the case of FFT-based unitary transform. By choosing the scale and exponent factors appropriately, the 2-stage precoder matrix can achieve the full diversity gain over time-selective fading channels.

In another embodiment, the MS-PPP uses the following 3-stage precoder matrix $$P = F\text{diag}[\exp(j\theta)]F^\dagger,$$

or $$P = F^\dagger \text{diag}[\exp(j\theta)]F.$$

For this embodiment, the precoder matrix becomes a circulant unitary matrix, which has some attractive features, e.g., the precoder matrix creates virtual multi-path delays, and BER analysis can be simplified. However, the circulant unitary matrix provides the full diversity gain for only time-selective fading channels.

In order to resolve the issue that the diversity gain can be lost over frequency-selective fading channels, some embodiments of the invention use the following 4-stage precoder matrix:

$$P = F \text{diag}[\exp(j\theta)] F^\dagger \text{diag}[\exp(-j\theta)],$$

or $$P = F^\dagger \text{diag}[\exp(j\theta)] F \text{diag}[\exp(-j\theta)].$$

In these embodiments, the precoder matrix is a column-wise rotated version of the circulant unitary matrix. This rotated circulant unitary matrix has a great advantage in BER performance. By optimizing the scale and exponent factors, this precoder matrix can achieve the full diversity gain for both the time-selective and frequency-selective fading channels. In addition, the methods of MS-PPP based on FFT and the diagonal phase rotation can be implemented in the log-linear complexity computation of order SK log K.

Increasing Diversity Gain with Coded Modulations

Some embodiments provide a joint optimization of the precoder matrix and the modulation format. The embodiments are based on realization that the diversity gain depends on the precoder matrix and the modulation format used at the modulator 113. The modulation format includes regular QAM, phase-shift keying (PSK), and amplitude-phase shift keying (APSK). Some embodiments use high-dimensional modulation (HDM), based on lattice packing or block coding. An HDM having largest possible minimum squared Euclidean distance is usually the best at mitigating the effect of deep fading because the receiver can still estimate the modulated data even if some symbols are missing due to the fading. The combination between HDM and precoding has an advantage that the use of HDM can relax the requirement of diversity gain achieved by a precoder itself.

In one embodiment, the HDM is based on a combination of QAM and a quasi-perfect block coding to increase the Euclidean distance. For example, HDM includes 8-dimensional modulation based on the extended Hamming code, 16-dimensional modulation based on the extended Nordstrom-Robinson (NR) nonlinear code, and 24-dimensional modulation based on the extended Golay code. While the NR code is nonlinear, the NR code has a binary image of a systematic linear octacode, whose generator matrix is expressed as $$G = \begin{bmatrix} 1 & 3 & 1 & 2 & 1 & 0 & 0 & 0 \\ 1 & 0 & 3 & 1 & 2 & 1 & 0 & 0 \\ 1 & 0 & 0 & 3 & 1 & 2 & 1 & 0 \\ 1 & 0 & 0 & 0 & 3 & 1 & 2 & 1 \end{bmatrix}.$$

The binary image is then produced by a Gray mapping of the octacode. Since the NR code has a minimum Hamming distance of 6, up to 2-bit errors can be corrected. This suggests that two-order or three-order diversity gains are guaranteed, respectively, for quadrature or binary PSK constellations by this code itself. In contrast, a best-known linear code for the same dimension has a minimum Hamming distance of 5, which also can correct 2-bit errors at maximum. Hence, the achievable diversity gain is identical for either nonlinear code or linear code. However, a larger Euclidean distance can provide an additional coding gain by the nonlinear code for HDM. Precoding matrix provides additional diversity gain with more relaxed constraint owing to HDM.

Low-Complexity Unitary Transforms

Some embodiments use FFT as unitary transform for wireless communications, because the FFT can simplify frequency-selective wireless channels for OFDM while the computational complexity is low in the log-linear order. However, the FFT requires complex-valued multiplications, which are more complicated than real-valued or semi-integer-valued multiplications for practical implementations. Some embodiments of the invention use even lower-complexity unitary transforms for the MS-PPP.

In these embodiments of the invention, the unitary matrices $U_1, U_2, \ldots, U_S$ 310, 320, 330 are selected from a set of fast unitary transforms, comprising a fast cosine transform (FCT), a fast slant transform (FST), a fast Walsh transform (FWT), and a fast Haar transform (FHT) in addition to the diagonal phase rotation D 320 and the FFT F. The set of fast unitary transforms also comprises the inverse transforms thereof, i.e., the conjugate transpose of the corresponding unitary matrix.

One embodiment uses the FCT, which forms a unitary matrix as follows $$C = \begin{bmatrix} c_{11} & \cdots & c_{1K} \\ \vdots & \ddots & \vdots \\ c_{K1} & \cdots & c_{KK} \end{bmatrix},$$

where the (n, m)-th element is expressed as $$c_{nm} = a(n) \frac{2}{\sqrt{K}} \cos \frac{\pi(n-1)(2m-1)}{2K},$$

$$a(n) = \begin{cases} \frac{1}{\sqrt{2}}, & n = 1, \\ 1, & \text{otherwise} \end{cases}.$$

The advantage of FCT over FFT lies in a fact that the computation is based on real-valued multiplications while a Cooley-Tukey-type butterfly architecture can be used to have a log-linear complexity order.

One embodiment uses the FST, which forms a unitary matrix in a recursive manner as follows $$S \Leftarrow \frac{1}{\sqrt{2}} \begin{bmatrix} A_{11} & 0 & A_{12} & 0 \\ 0 & I & 0 & I \\ A_{21} & 0 & A_{22} & 0 \\ 0 & I & 0 & -I \end{bmatrix} \begin{bmatrix} S & 0 \\ 0 & S \end{bmatrix},$$

where the size of the unitary matrix is recursively doubled. The initial matrix for a size of 2×2 is expressed as $$S = \frac{1}{\sqrt{2}} \begin{bmatrix} 1 & 1 \\ 1 & -1 \end{bmatrix},$$

and the matrices $A_{11}, A_{12}, A_{21}, A_{22}$ are defined at the n-th recurvsion as follows $$A_{11} = \begin{bmatrix} 1 & 0 \\ a_n & b_n \end{bmatrix}, A_{12} = \begin{bmatrix} 1 & 0 \\ -a_n & b_n \end{bmatrix},$$

-continued $$A_{21} = \begin{bmatrix} 0 & 1 \\ -b_n & a_n \end{bmatrix}, A_{22} = \begin{bmatrix} 0 & -1 \\ b_n & a_n \end{bmatrix},$$

where $a_n = \sqrt{3 \cdot 2^{2n}/(2^{2n+2}-1)}$ and $b_n = \sqrt{(2^{2n}-1)/(2^{2n+2}-1)}$. Here, the matrices O and I are an all-zero matrix and an identity matrix of appropriate size. The FST is also based on a real-valued unitary matrix like FCT, and can be implemented in a log-linear complexity with a Cooley-Tukey-type architecture. The FST is slightly simpler than FCT since it does not need trigonometric functions and the basis function is expressed as a piece-wise linear function.

One embodiment uses the FWT, which forms a unitary matrix in a recursive manner as follows:

$$W \Leftarrow \frac{1}{\sqrt{2}} \begin{bmatrix} W & W \\ W & -W \end{bmatrix},$$

from an initial matrix of W=[1]. The FWT is even simpler than the FST because the FWT is based on a semi-integer unitary matrix, whose entry is either +1 or −1 excluding a common normalization factor. In addition, the FWT is implemented in a log-linear complexity with a Cooley-Tukey-type architecture.

One embodiment uses the FHT, which forms a unitary matrix in a recursive manner as follows:

$$H \Leftarrow \frac{1}{\sqrt{2}} \begin{bmatrix} H \otimes [1 \ 1] \\ I \otimes [1 \ -1] \end{bmatrix},$$

where an operator $\otimes$ denotes a Kronecker product. The computational complexity of the FHT is even lower than the FWT because there are a lot of zero entries to be implemented in a linear complexity order, while it is still based on a semi-integer unitary matrix.

Accordingly, some embodiments use fast unitary transforms for low-complexity applications. The computational complexities of FFT, FCT, FST, FWT, FHT, and diagonal phase rotation are in the descending order. By optimizing the scale factor and the exponent factor depending on the unitary transforms and the modulation format, the MS-PPP can still provide the full diversity gain in a low complexity order.

MS-PPP Design in Time-Selective and Frequency-Selective Fading

Some embodiments of the invention are based on recognition that the phase rotation value forming the precoder matrix can be optimized to increase the pairwise codeword distance of transmitted symbols. The methods of the embodiments do not need a channel feedback to adaptively optimize the precoder matrix depending on the channel responses, while the full-diversity performance is guaranteed by optimizing the precoder matrix for overall channel realizations so that the pre-determined precoder matrix can be used for all the time.

Figure 4:
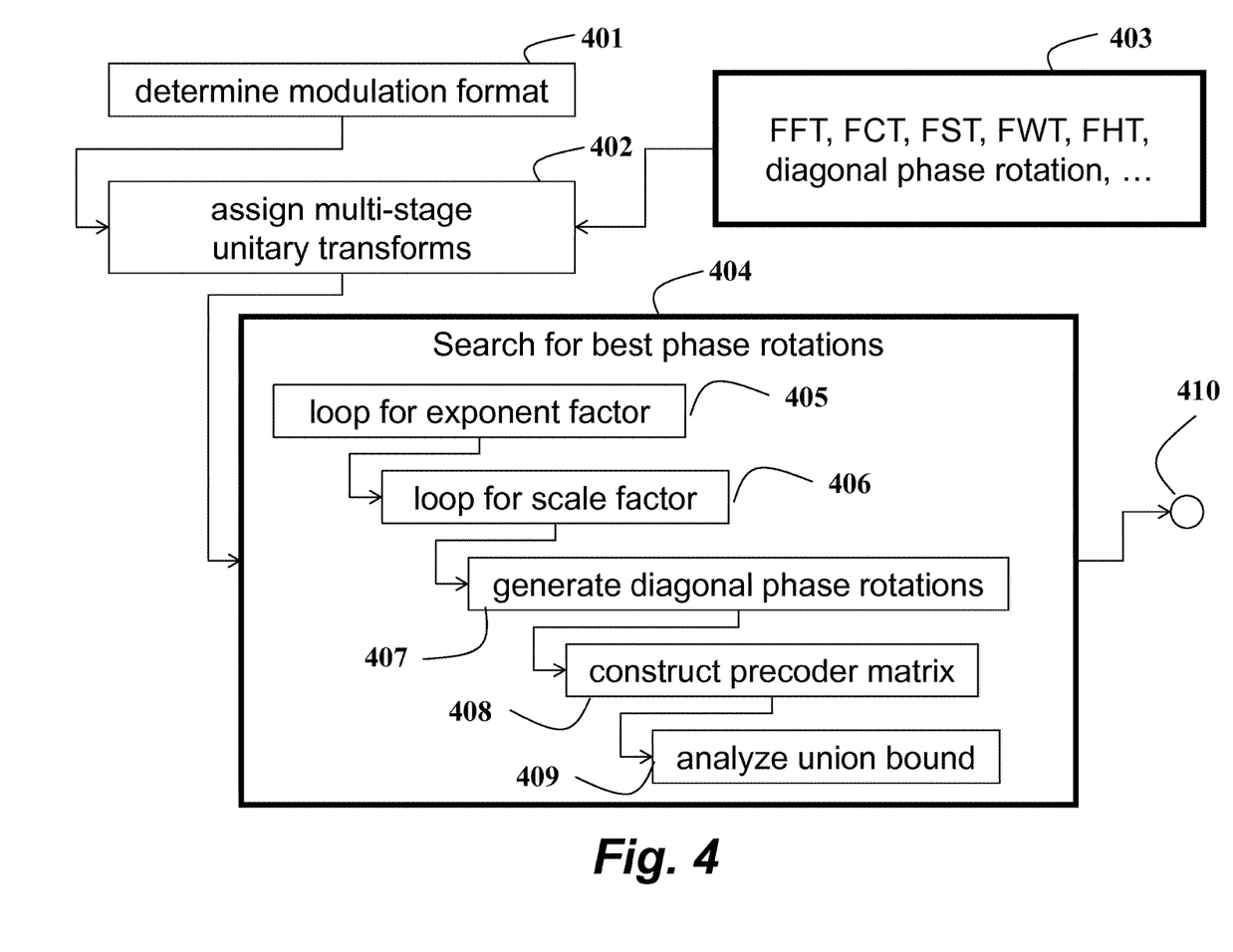
FIG. 4 is a schematic of design method for MS-PPP to minimize bit-error rate (BER) according to some embodiments of the invention.

FIG. 4 shows a block diagram for optimizing the phase rotation value of MS-PPP according to the embodiments of the invention. The methods first determine the modulation format 401, which has a large Euclidean distance. For example, 16-dimensional modulation based on the extended NR code is selected. Then, the methods assign 402 which unitary transforms are used at multiple stages from a set of unitary transforms 403. The set of unitary transforms 403 comprises fast-transformable unitary matrices such as FFT, FCT, FST, FWT, FHT, and diagonal phase rotation. For example, the methods assign the inverse diagonal phase rotation for the first stage, the inverse FFT for the second stage, the diagonal phase rotation for the third stage, and the FFT for the last stage, according to one embodiment of the 4-stage precoding with $U_1=D^\dagger$, $U_2=F^\dagger$, $U_3=D$, $U_4=F$.

Given the determined modulation format and the assigned unitary transforms, the methods of the embodiments search 404 for the best phase rotation values θ. The search is performed by a 2-dimensional grid search, in which the exponent factor β is iteratively set 405 from a minimum value to a maximum value with a small step, and the scale factor α is iteratively set 406 from a minimum value to a maximum value with a small step. For example, the first loop changes the exponent factor β from 0.25 to 4.00 at an increment step of 0.25, and the second loop changes the scale factor α from 0 to π at an increment step of 0.01.

For every loop, the methods generate 407 the diagonal phase rotation to produce the unitary matrix D=diag[exp(jθ)] according to phase rotation values θ formed by the power function having the given scale factor α and exponent factor β. According to the assigned unitary transforms, the corresponding precoder matrix for the MS-PPP is constructed 408. For example, the precoder matrix is constructed by a product of unitary matrices as $P=U_4 U_3 U_2 U_1$ for 4-stage precoding.

The precoder matrix is analyzed 409 to calculate an expected BER performance, based on a union bound (UB) over all pairwise error probability (PEP). In time-selective fading channels, the deframed data can be expressed as $$y = \text{diag}[h]Px + z,$$

where $y=[y_1, y_2, \ldots, y_K]^T$ is the deframed data, $h=[h_1, h_2, \ldots, h_K]^T$ is a vector of channel responses, and $z=[z_1, z_2, \ldots z_K]^T$ is an additive noise having a covariance matrix of $\sigma^2 I$. For mobile communications, the channel response vector is modeled by Rayleigh fading with Jakes auto-correlation function. For this case, the channel vector follows a correlated Gaussian distribution having a covariance matrix of R, wherein the covariance matrix is a symmetric Toeplitz matrix formed by a zero-th order Bessel function of the first kind as follows $R_{nm}=J_0(2\pi f_D T_s |m-n|)$, where $R_{nm}$ is the (n, m)-th element of R, $J_0(\cdot)$ denotes the Bessel function of the first kind, $f_D$ is the maximum Doppler frequency, and $T_s$ is the symbol duration.

The PEP over fading channels can be expressed as $$Pr(s \to s') = \int \frac{1}{2} \text{erfc} \sqrt{\frac{\|\text{diag}[h]P(x(s)-x(s'))\|^2}{\sigma^2}} \frac{1}{|\pi R|} \exp(-h^\dagger R^{-1} h) dh,$$

where s is an index of one coded modulation symbol, $s' \neq s$ is another index of erroneous coded modulation, x(s) denotes the s-th constellation symbol, erfc(•) is the complementary error function, ||•|| denotes a Frobenius norm, and |•| denotes a matrix determinant. Using an exponential approximation for the complementary error function of $$\text{erfc}\sqrt{x} \cong \frac{1}{6}\exp(-x) + \frac{1}{2}\exp\left(-\frac{4}{3}x\right),$$

the PEP can be rewritten as follows:

$$Pr(s \to s') \cong \frac{1}{12|R|\left|R^{-1} + \frac{1}{\sigma^2}\Lambda\right|} + \frac{1}{4|R|\left|R^{-1} + \frac{4}{3\sigma^2}\Lambda\right|},$$

where $\Lambda = \text{diag}[P(x(s)-x(s'))]\text{diag}[P(x(s)-x(s'))]^\dagger$. Using the PEP, the BER performance is upper-bounded by a UB, defined as follows:

$$P_{union} = \frac{1}{S} \sum_{s \ne s'} d_H(s, s') Pr(s \to s'),$$

where $\rho$ is the cardinality of the modulation format, and $d_H(\cdot)$ is the Hamming distance. When a coherence time of the channel is small enough compared to the interleaver size, the covariance matrix approaches an identity matrix. For this case, the PEP can be simplified as $$Pr(s \to s') \cong \frac{1}{12} \prod \frac{1}{1+\rho d_k^2} + \frac{1}{4} \prod \frac{1}{1+\frac{4}{3}\rho d_k^2},$$

where $$d_k^2 = |e_k^T P(x(s) - x(s'))|^2,$$

wherein $\rho$ is an average signal-to-noise ratio (SNR), and $e_k$ is a unit vector whose elements are all zero but one at the k-th element.

In one embodiment, the analysis of the union bound 409 assumes frequency-selective fading channels. For this embodiment, the PEP is calculated by an effective precoder matrix, which has another FFT as FP after constructing the precoder matrix 408. The covariance matrix uses an exponential auto-correlation. In yet another embodiment, the analysis of the union bound 409 is performed by assuming the worst case of time-selective fading channel and frequency-selective fading channel, in order to be robust against different channel conditions. For example, the worst-case union bound is derived by the maximum value between one union bound for the precoder matrix P and another union bound for the effective precoder matrix FP.

After iterating all pairs of the exponent factor and the scale factor in loops 405, 406, the methods produce the best precoder matrix 410, which provides the minimum UB. For example, as a result of the optimization method, one embodiment of the invention guarantees the pairwise codeword distance to minimize the UB, using deterministic two parameters ($\alpha$, $\beta$) defining phase rotation values.

Figure 5:
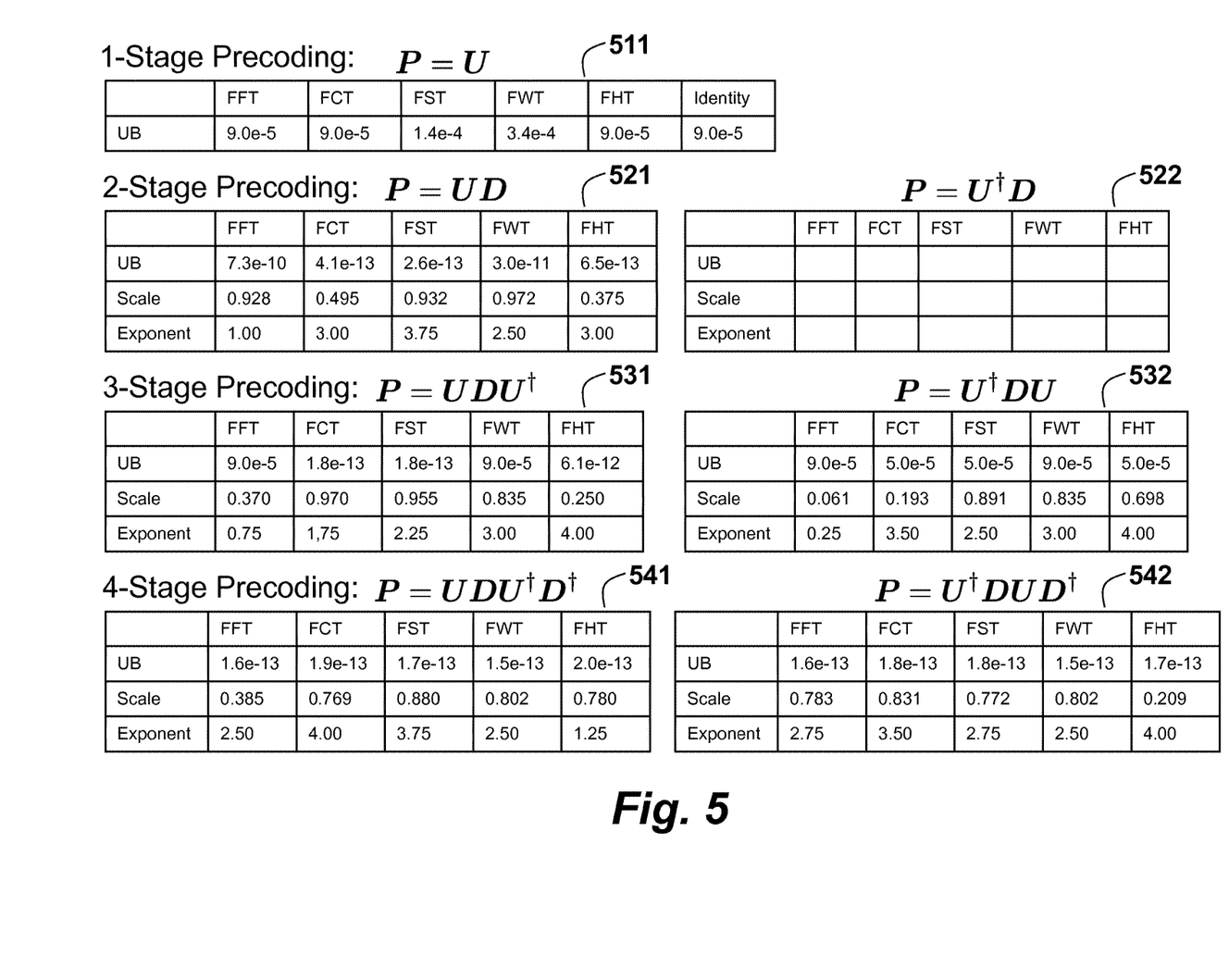
FIG. 5 is a table of examples of optimized MS-PPP according to some embodiments of the invention.

FIG. 5 shows some non-limiting examples of the optimized factors in tables to minimize the worst-case union bound for both time-selective and frequency-selective fading channels assuming infinitesimally short coherence time and narrow coherence bandwidth as a special case. Here, the best diagonal phase rotations and the minimum union bounds are present at an average SNR of 20 dB for various different unitary transforms used at different stages. The 16-dimensional modulation based on the extended NR code is used. The 1-stage precoding of the form P=U 511 has a bad UB performance around $P_{union} \approx 10^{-4}$ no matter which unitary transform is used, because there is little diversity gain due to the coded modulation only. The 2-stage precoding 521, 522 improves the diversity gain to achieve a UB performance of $P_{union} \approx 10^{-9}$. Some unitary transforms can outperform the FFT, and achieve $P_{union} \approx 10^{-13}$, which is the UB achieving the full diversity. For the 3-stage precoding of the form P=UDU$^\dagger$ 531, the FCT and FST achieve the full diversity gain. Moreover, the 4-stage precoding 541, 542 achieves the full diversity gain regardless of unitary transforms.

Soft Channel Estimation and Iterative Equalization

The channel estimator 102 at the receiver uses pilot symbols to estimate the channel responses h. In one embodiment of the invention, the channel estimation uses a maximum a posteriori probability (MAP) criterion to produce an estimate of the channel responses, with additional side information indicating the estimation accuracy. The deframed data fed into channel estimator are modeled in two ways as follows $$y=Hx+z=Xh+z,$$

where X=diag[Px] comprises pilot symbols, and H=diag[h]P comprises channel responses vector. Assuming that the channel responses vector follows complex Gaussian distribution as Rayleigh fading, the MAP channel estimation is obtained by a conditional mean for a conditional probability of Pr(h|y) as follows $$\hat{h}=Q'X^\dagger \Sigma^{-1} y,$$

where $\Sigma$ is a covariance matrix of the noise vector z. Here, Q' is referred to as a conditional covariance matrix, calculated as follows $$Q'=(X^\dagger \Sigma^{-1} X + Q^{-1})^{-1},$$

where Q is a covariance matrix of the channel vector h. Some conventional equalizers use just the estimated channel responses vector $\hat{h}$. In this embodiment of the invention, not only the estimated channel responses vector $\hat{h}$ but also the conditional covariance matrix Q' are used. The channel estimation accuracy can be measured by this conditional covariance matrix. More specifically, the channel estimation is more accurate if the eigenvalues of Q' are smaller. In addition, this embodiment can combine with modified probabilistic data association (PDA) equalization, which assumes that the data has also uncertainty defined by another covariance matrix of R.

Figure 6:
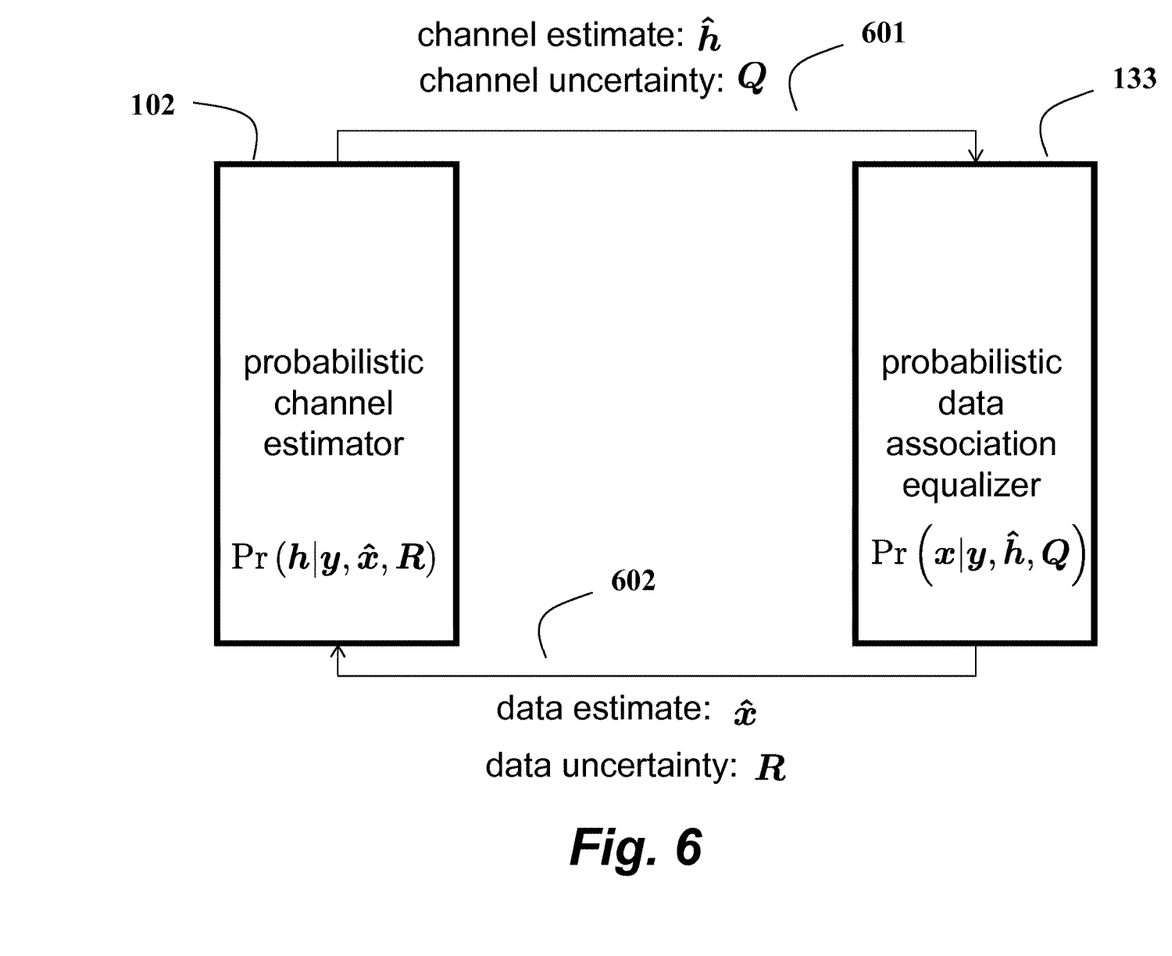
FIG. 6 is a block diagram of iterative equalization with soft-decision channel estimation and demodulation according to some embodiments of the invention.

FIG. 6 shows a block diagram of iterative equalization and channel estimation accounting for equalization uncertainty and estimation uncertainty. The channel estimator 102 uses the data following complex Gaussian distribution with conditional mean $\hat{x}$ and conditional covariance matrix R having ones but zero at pilot symbols. The channel estimator 102 updates the conditional mean $\hat{h}$ and the conditional covariance Q 601 given y, $\hat{x}$, and R. The update is based on the MAP estimation to maximize the conditional probability of Pr(h|y, $\hat{x}$, R). The PDA equalization 133 then updates the conditional mean $\hat{x}$ and the conditional covariance R 602 given y, $\hat{h}$, and Q. The PDA's update is based on the MAP estimation to maximize the conditional probability of Pr(x|y, $\hat{h}$, Q).

This embodiment is based on recognition that the equalized data can be used to refine the channel estimation accuracy further because the information data can be used as additional pilot symbols. The performance advantage comes from the treatment of covariance matrix updates for both data equalization and channel estimation. By assuming uncertainty as Gaussian distribution, the methods of the embodiment can converge to the best possible MAP solution of data equalization and channel estimation.

In one embodiment, the equalization uses maximum-likelihood (ML) block equalization, which searches for the most likely data from overall the data combinations. For the case of short-message framing such as 8 bits per block, the ML equalization is computationally feasible.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for communicating data from a transmitter to a receiver in a wireless communication network, comprising:
    modulating time series data symbols using a coded modulation to produce time series modulated symbols;
    precoding the time series modulated symbols using a precoder matrix to produce precoded symbols, wherein the precoder matrix is formed using a rotation matrix including phase angles for at least some elements of the rotation matrix with values determined according to a parametric function of indices of the elements storing the phase angles,
    wherein the rotation matrix is a diagonal matrix, wherein the precoder matrix is formed using a product of the rotation matrix with at least one unitary transform matrix,
    wherein the phase angles on a diagonal of the rotation matrix are monotonically increasing or decreasing, and
    wherein the function of indices is a power function, such that the monotonically increasing or decreasing phase angles are formed according to the power function as $\theta k = \pi \alpha \lfloor (k-1) \rfloor^\beta$, where $\theta\_k$ is the k-th phase angle in $\theta$, $\pi = 3.14 \ldots$ is a mathematical constant, $\alpha$ is a scale factor, and $\beta$ is an exponent factor, wherein the scale parameter and the exponent parameter are pre-determined such that the precoded symbols reduce a bit error rate (BER) for the transmitting;
    forming data packets using the precoded symbols; and
    transmitting the data packets over the wireless network, where at least some steps of the method are performed by the transmitter.

2. The method of claim 1, wherein the function of indices includes at least one parameter with a value selected to reduce a bit-error rate (BER) for the transmitting.

3. The method of claim 2, wherein the value of the parameter is selected to minimize a union bound (UB) over all pairwise error probability (PEP) of the precoded symbols for a type of the coded modulation.

4. The method of claim 1, wherein the precoder matrix P is formed using a 2-stage phase precoding according to $P = U \, \text{diag}[\exp(j\theta)]$, wherein $j = \sqrt{(-1)}$ is an imaginary unit, U is the unitary transform matrix, diag[•] denotes the diagonal matrix, exp (•) denotes an element-wise exponential function, and $\theta$ has monotonically changing phase angles.

5. The method of claim 1, wherein the precoder matrix is formed using 3-stage phase precoding as the product of the rotation matrix with at least two unitary transform matrices.

6. The method of claim 5, wherein the precoder matrix P is formed according to $P = U \, \text{diag}[\exp(j\theta)] U^\dagger$, wherein $j = \sqrt{(-1)}$ is an imaginary unit, U is a unitary transform matrix, \ denotes a conjugate transpose of the matrix, diag[•] denotes a diagonal matrix, exp (•) denotes an element-wise exponential function, and $\theta$ has monotonically increasing phase angles.

7. The method of claim 5, wherein the precoder matrix P is formed based on a circulant unitary matrix according to $P = F \, \text{diag}[\exp(j\theta)] F^\dagger$, wherein $j = \sqrt{(-1)}$ is an imaginary unit, F is a fast Fourier transform (FFT) matrix, † denotes a conjugate transpose of the matrix, diag[•] denotes a diagonal matrix, exp (•) denotes an element-wise exponential function, and $\theta$ has monotonically increasing phase angles.

8. The method of claim 1, wherein the precoder matrix is formed using a product of the rotation matrix with at least three unitary transform matrices forming 4-stage phase precoding.

9. The method of claim 8, wherein the precoder matrix P is formed according to $P = U \, \text{diag}[\exp(j\theta)] U^\dagger \text{diag}[\exp(-j\theta)]$, wherein $j = \sqrt{(-1)}$ is an imaginary unit, U is a unitary transform matrix, † denotes a conjugate transpose of the matrix, diag[•] denotes the diagonal matrix, exp (•) denotes an element-wise exponential function, and $\theta$ has monotonically changing phase angles, wherein the unitary transform matrix U is one or combination of a fast Haar transform (FHT), a fast slant transform (FST), a fast cosine transform (FCT), a fast Walsh transform (FWT), a fast Fourier transform (FFT).

10. The method of claim 1, further comprising:
    performing channel estimation and equalization of the transmitted data iteratively by updating conditional mean and covariance matrix for maximum a posteriori probability (MAP) estimation.

11. A transmitter for communicating data to a receiver in a wireless network, comprising:
    a modulator for time series modulating data symbols using a coded modulation to produce time series modulated symbols;
    a precoder for precoding the time series modulated symbols using a precoder matrix to produce precoded symbols, wherein the precoder matrix is formed using multiple unitary transforms including a diagonal phase rotation for at least some of the unitary transforms with phase angle values determined according to a function of indices of the diagonal elements storing the phase angles, wherein the phase angle values on the diagonal phase rotation are monotonically increasing or decreasing, wherein the function of indices is a power function, and wherein the power function is $\theta k = \pi \alpha \lfloor (k-1) \rfloor^\beta$, where $\theta\_k$ is the k-th phase angle in $\theta$, $\pi = 3.14 \ldots$ is a mathematical constant, $\alpha$ is a scale factor, and $\beta$ is an exponent factor, wherein the scale parameter and the exponent parameter are pre-determined such that the precoded symbols reduce a bit error rate (BER) for the transmitting;
    a framer for forming data packets using the precoded symbols; and
    a digital-analog (D/A) front-end for transmitting the data packets over the wireless network.

12. The transmitter of claim 11, wherein each unitary transform is a unitary transform matrix, wherein the diagonal phase rotation is a diagonal rotation matrix, and wherein the precoder matrix is formed using a product of the diagonal rotation matrix with at least three unitary transform matrices forming 4-stage phase precoding.

13. The transmitter of claim 12, wherein the precoder matrix P is formed according to $$P = U \, \mathrm{diag}[\exp(j\theta)] U^\dagger \mathrm{diag}[\exp(-j\theta)],$$

wherein $j=\sqrt{-1}$ is an imaginary unit, U is a unitary transform matrix, † denotes a conjugate transpose of the matrix, diag[•] denotes the diagonal matrix, exp (•) denotes an element-wise exponential function, and θ has monotonically changing phase angles.

14. The transmitter of claim 13, wherein the unitary transform matrix U is one or combination of a fast Haar transform (FHT), a fast slant transform (FST), a fast cosine transform (FCT), a fast Walsh transform (FWT), a fast Fourier transform (FFT).

* * * * *